United States Patent [19]

Pape et al.

[11] 4,148,941

[45] Apr. 10, 1979

[54] PROCESS FOR DUST REDUCTION TREATMENT OF EXPANDED PERLITE

[75] Inventors: Hans Pape, Dortmund; Joseph Siebel, Bochum, both of Fed. Rep. of Germany

[73] Assignee: Ekoperl GmbH, Dortmund, Fed. Rep. of Germany

[21] Appl. No.: 877,272

[22] Filed: Feb. 13, 1978

[30] Foreign Application Priority Data

Sep. 1, 1977 [DE] Fed. Rep. of Germany ....... 2739375

[51] Int. Cl.² .......................... C04B 31/26; B65B 1/18
[52] U.S. Cl. .................................... 427/214; 264/117; 264/42; 427/220; 427/221; 252/378 P; 106/DIG. 2
[58] Field of Search ........................ 427/214, 220, 221; 252/378 P, 378 R; 264/117; 106/DIG. 2; 264/42

[56] References Cited

U.S. PATENT DOCUMENTS

| 2,625,512 | 1/1953 | Powell | 252/378 P |
| 3,010,840 | 11/1961 | Goff | 427/220 |

FOREIGN PATENT DOCUMENTS

| 569677 | 1/1959 | Canada | 427/220 |
| 1807409 | 8/1969 | Fed. Rep. of Germany | 252/378 |
| 952855 | 3/1964 | United Kingdom | 427/220 |

*Primary Examiner*—Sam Silverberg
*Attorney, Agent, or Firm*—Thomas R. Morrison

[57] ABSTRACT

The dust fraction of expanded perlite is bonded to the larger sized grains by spraying finely atomized paraffin at a temperature of less than 130° C. upon the perlite which has been cooled to a temperature of less than 130° C. In a second embodiment of the invention, the perlite is treated with a water repellent process prior to the paraffin treatment.

11 Claims, 1 Drawing Figure

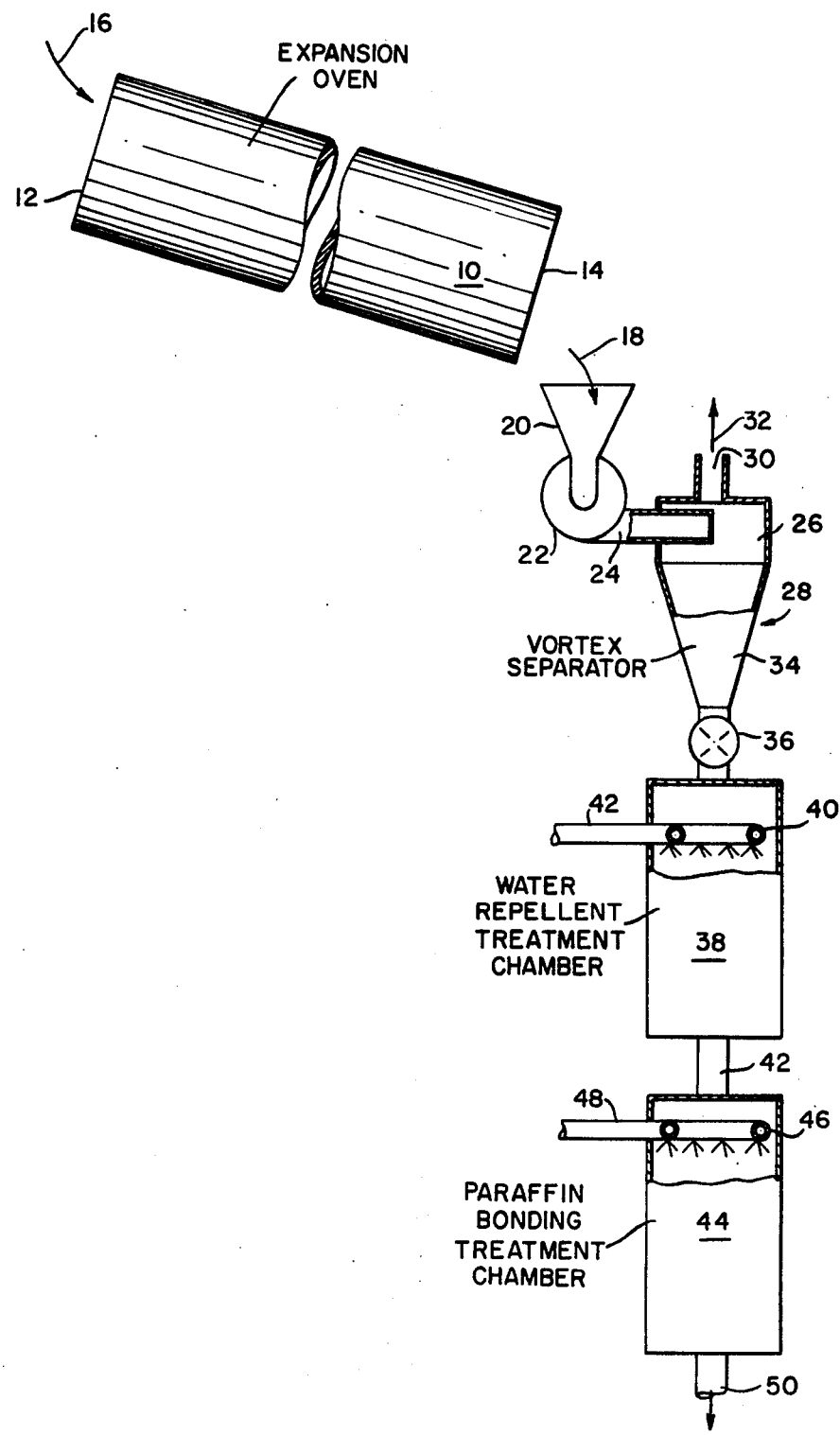

PROCESS FOR DUST REDUCTION TREATMENT OF EXPANDED PERLITE

BACKGROUND OF THE INVENTION

The present invention relates to a process for reducing the free dust in expanded perlite.

Perlite is expanded at temperatures of about 1100° C. in an expansion oven. From the expansion oven, the perlite may be conveyed through a vortex separator which separates and discharges the finest particles, below about 0.2 mm, and passes the larger particles to a bagging operation.

In its transmission from the expansion oven to the bagging operation, the perlite must be cooled from its expansion temperature of about 1100° C. to a temperature which is compatible with handling in the bagging operation. Since modern bagging practice employs plastic sacks, the temperature of the perlite must be reduced to 130° C. or less.

Expanded perlite is used, for example, for sound and heat insulation in walls and ceilings and as a resilient support below flooring. In addition, the oleophilic properties of expanded perlite make it useful for the sorption of oil from the surface of water. The utility of expanded perlite in sorbing oil from the surface of water is improved by a treatment which makes it more water resistant. This is normally accomplished by treating the perlite with a water resistant material such as silicone. Unfortunately, the usual treatment for water resistance increases the tendency of the perlite to break up into dust particles. Consequently the problem is compounded in the usual process of treating perlite for water repellency.

There are methods taught in the prior art for causing the dust in perlite to bond to the larger particles. For example, German Pat. No. 1,269,602 teaches the application of an organic hygroscopic compound to the perlite grains. The hygroscopic compound attracts and holds atmospheric moisture. The moistening of the perlite grains reduces the tendency of the material to dust. Organic hygroscopic compounds such as glycols, lactate and triethanolamine soaps and particularly glycerine are suitable for this application.

Hygroscopic bonding suffers from a number of problems. At low humidity or high temperature, insufficient moisture is attracted to the perlite to bond the dust portion. Furthermore the moisture bonding with hygroscopic compounds is effective only on the finest particles and becomes less effective as the particle size increases. This results in intermediate particle sizes remaining free to create a dust nuisance. This problem becomes especially acute under mechanical stress such as is experienced during the flow of the material through pipes or during transportation in sacks or during discharge from the pipes or sacks.

The dust treatment using hygroscopic compounds is incompatible with the silicone treatment for water resistance. Consequently it is not possible by the known methods to have both good water resistance combined with lack of dusting.

Although mechanical removal of the finest grain fractions is theoretically possible, such mechanical removal of the fraction below about 0.2 mm, for example, by sieving, winnowing or by the use of cyclones presents difficulties in accomplishment and gives a finished product which is not satisfactory for some applications. The cost of separation of large quantities of light materials such as perlite dust is very expensive and time consuming. The separated dust fraction does not contribute to product weight or bulk, and consequently represents a serious loss in product output. An even more serious problem, particularly in the use of expanded perlite as an oil sorbent medium, is that the finest grains which would be removed by a mechanical removal process are the part of the product representing a great proportion of the surface area of the material as well as a great volume of internal pores by which large absorption capacity for oily fluids is provided. It is therefore desirable that removal and discarding of the dust portion of expanded perlite may be avoided at least to some extent in order to improve the product capability for sorption of oily fluids as well as maintaining product output.

Complete removal of the dust portion of expanded perlite is also not desirable in the application of filling under floor surfaces. The finer fraction tends to fill the interstices between the coarser grains and provide a more solid mass which is superior in supporting the floor and in thermal insulation.

SUMMARY

The present disclosure teaches a process for bonding dust of expanded perlite to the larger grains of the perlite to retain the product, improve its oil sorptive capacity and in a second embodiment, also permit treatment for water repellency.

In the disclosed process, perlite is expanded in an expansion oven at about 1100° C. Upon removal from the furnace, the perlite is cooled to less than 130° C. and is blown in an air stream past spray nozzles which spray a finely atomized paraffin hydrocarbon in the ratio of from about 2 to about 10 and preferably from about 3 to about 6 kilograms of paraffin hydrocarbon per cubic meter of expanded perlite. In the preferred embodiment of the invention, a liquid hydrocarbon preferably having a viscosity range from about 4 to about 8 centistokes, measured at 20° C. is used. Either pure paraffin hydrocarbon or paraffin mixed with a proportion of aromatics and naphthenes are satisfactory. Pasty or solid paraffins of high molecular weight may be made dispersable with the addition of organic fluids of low molecular weight as a solvent or alternatively by heating.

According to reasoning from the prior art, a paraffin-containing hydrocarbon dust bonding agent would be rapidly sorbed into capillaries of the oleophilic perlite and would be unavailable at the surface of the perlite grains to bond the dust particles to larger grains and to each other. The long history of using hygroscopic compounds to moisture bond the dust particles would suggest that the elimination of the hygroscopic compounds and the consequent elimination of the water attracted from the air would increase the paraffin oil portion required to achieve water-free dust bonding to such a great extent that the process would no longer be economic.

The applicants have discovered that dust bonding of expanded perlite can be achieved with a reasonable proportion of paraffin hydrocarbon sprayed into a free-flowing stream of expanded perlite. The applicants have also discovered that a water repellent treatment of the expanded perlite can be performed without interfering with the dust bonding performance of the paraffin.

In one embodiment of the invention, a finely atomized paraffin oil is added to a free-flowing stream of expanded perlite. The perlite and paraffin hydrocarbon are both provided at a temperature of less than 130° C.

Investigation has shown that when the process according to the invention is carried out as described, the paraffin hydrocarbon attaches itself principally to the fine grains which form dust instead of being sorbed within the capillaries of the larger particles. The paraffin-treated fine grains become strongly adhered to the coarse grains. Thus, contrary to expectation, water-free bonding of dust particles in expanded perlite is achieved with a reasonable proportion of paraffin hydrocarbon.

In a second embodiment of the invention, the loose perlite material is treated with a water repellent treatment at temperatures of more than 250° C. before the dust bonding treatment and is then further cooled to temperatures of less than 130° C. and is treated as previously described with finely atomized paraffin hydrocarbon at a temperature of less than 130° C. It would be evident to one skilled in the art, that both the water repellent treatment and the dust bonding treatment may be performed in a single continuously flowing operation or the treatments may be separately performed with intermediate storage.

The combined treatment with paraffin for dust bonding and with a water repellent such as with silicone is a synergistic process. The paraffin hydrocarbons become largely attached to the finer particles and thereby provide dust bonding whereas the water repellent materials become attached primarily to the larger particles of the expanded perlite. Therefore the two treatments interact in a quite unexpected manner to provide a relatively dust free and water repellent perlite which does not depend upon hygroscopic attraction of atmospheric water.

Since the fine particles which normally form dust can be bonded to the larger perlite particles by the process of the present invention, it is less necessary to remove the dust particles than was the case in the prior art. Prior art processes normally employed vortex separators or the like to remove the dust either immediately after expansion or at some other point in the handling process. In the disclosed process of the present invention, the vortex separation can be either eliminated or its efficiency reduced in order to retain more of the product and to improve the oil sorbency and other properties which result from the retention of fine particles in the final product as previously explained.

EXAMPLES

1. Perlite thermally expanded at about 1100° C. (grain size up to about 2 mm.), was made water-repellent by surface treatment with silicones by a known process. The finest grain fraction, below 0.2 mm., determined by sieving, amounted to more than 10%. The effective dust fraction determined by a conventional method was over 1000 milligrammes per liter.

In a subsequent operation the same material was sprayed with a paraffin oil (viscosity 7 centistokes, density at 15° 0.83) while the temperature of the expanded perlite was about 80° C. The quantity of paraffin oil added was about 5 kg. per cubic meter of perlite. As a result of this dust-bonding treatment the fraction of perlite below 0.2 mm. grain size was reduced to 2.3% as determined by sieving, or to 20 milligrammes per liter which must be regarded as an outstanding result. The water repellency of the product was about 10% greater when compared with the non-dust bonded water-repellent perlite.

2. Thermally expanded perlite with a grain size of up to about 6 mm. was treated with silicones as in example 1. The fraction below 0.2 mm. before treatment was 6%. The effective dust fraction was of the order of 500 mg./liter. A subsequent spraying process with paraffin oil in the proportion of 3.5 liters/m$^3$ of perlite sufficed to reduce the fraction below 0.2 mm. as determined by sieving, to 1.5% or 17 mg./liter.

BRIEF DESCRIPTION OF THE DRAWING

The FIGURE shows a schematic diagram of the process of the present invention.

DETAILED DESCRIPTION OF THE PREFERRED EMBODIMENT

Referring to the drawing, an expansion oven 10 which may conveniently be of elongated cylindrical shape has its axis tilted whereby its first end 12 is elevated about its second end 14. Perlite material to be expanded is charged into the expansion oven at the first end 12 as indicated by the arrow 16. The charging may be a continuous or discontinuous process. In the preferred embodiment continuous charging is employed.

The expansion oven 10 is heated to a temperature of about 1100° C. by means well known in the art and thus not shown. The expansion oven 10 is preferably rotated or vibrated to turn over the perlite being expanded and to aid in its motion through the expansion oven 10. The perlite moves from the first end 12 to the second end 14 of the expansion oven 10 at least partly by gravity and is removed from the expansion oven 10 as indicated by the arrow 18 into a hopper 20.

A blower 22 mixes the expanded perlite with air and moves it in a stream through a conduit 24 and thence tangentially into the upper large diameter section 26 of a vortex separator 28.

As is well known in the art, a vortex separator is effective to separate fine particles from larger particles of material in a free-flowing air stream. The fine particles tend to remain suspended in the air stream longer than the larger particles and consequently are expelled with the air through the discharge port 30 as indicated by the arrow 32. The fine particles mixed with the air passing through the discharge port 30 are later separated from the air by conventional processes not of interest here. The larger particles pass downward through the reducing conical section 34.

A gate 36 may be optionally employed to control the flow of expanded perlite from the reducing conical section to the next operation. When opened, the gate 36 permits the perlite to pass in a free-flowing stream into the next stage of the process.

The free-flowing perlite from the gate 36 flows into and through a water repellent treatment chamber 38. A spray head 40 being fed a silicone water repellent mixture by a conduit 42 produces finely atomized liquid silicone which is deposited upon the expanded perlite falling through the water repellent treatment chamber. As it flows in a free stream past the spray head 40, the expanded perlite is at a temperature of more than 250° C.

The water-repellent-treated perlite is conducted through conduit 42 into a paraffin bonding treatment chamber 44. The expanded perlite is cooled in its transit to the paraffin bonding treatment chamber 44 and enters the paraffin bonding treatment chamber 44 at a temperature of less than 130° C. The perlite passes a paraffin spray head 46 which is fed with a paraffin hydrocarbon at a temperature of less than 130° C. via a conduit 48. The expanded perlite receives the finely atomized paraffin from spray head 46 during its passage therepast.

The water-repellent-treated and paraffin-dust-bonding-treated expanded perlite is removed from the paraffin bonding treatment chamber 44 through a product delivery discharge 50 to a conventional bagging operation, now shown.

As previously discussed, vortex separation of the dust portion of expanded perlite may, in certain circumstances, be eliminated with the paraffin bonding treatment for dust reduction disclosed in the present application. Consequently the vortex separator 28 may optionally be deleted from the process shown in the figure. In addition, certain applications do not require the water repellent treatment added to the perlite in water repellent treatment chamber 38. Consequently the manufacture of expanded perlite for certain applications may be performed using a system which omits the water repellent treatment chamber 38 and/or the vortex separator 28. When both the vortex separator 28 and the water repellent treatment chamber 38 are omitted from the process, means must be provided for reducing the temperature of the expanded perlite from its 1100° C. temperature as it is withdrawn from the expansion furnace to a temperature below about 130° C. This temperature reduction may be accomplished by passing the expanding perlite through conduit 42 or by intermediate storage during which the temperature may decay as required by the process.

It will be understood that the claims are intended to cover all changes and modification of the preferred embodiments of the invention, herein chosen for the purpose of illustration which do not constitute departures from the spirit and scope of the invention.

What is claimed is:

1. A process for bonding the dust particles of dry perlite which has been expanded in an expansion oven at about 1100° C. comprising:
   (a) removing the expanded perlite from said expansion oven in a continuous free flowing stream;
   (b) removing a substantial part of said expanded perlite having a grain size smaller than about 0.2 millimeters in a vortex separator;
   (c) cooling the expanded perlite to a temperature of less than 130° C.;
   (d) passing the expanded perlite at less than 130° C. in a loose free flowing stream past a spray head; and
   (e) spraying a finely atomized paraffin hydrocarbon having a viscosity of from about 4 to about 8 centistokes measured at 20° C. from said spray head upon said expanded perlite flowing therepast.

2. The process recited in claim 1 further comprising:
   (a) cooling the expanded perlite to an intermediate temperature greater than 250° C.;
   (b) passing the expanded perlite in a loose free flowing stream at an intermediate temperature greater than 250° C. past a second spray head located between said expansion oven and said spray head;
   (c) spraying a finely atomized liquid water repellent from said second spray head upon said expanded perlite flowing therepast; and then
   (e) performing steps (c), (d) and (e) of claim 1.

3. The process recited in claim 2 further comprising:
   (a) passing said expanded perlite through a blower between said expansion furnace and said vortex separator;
   (b) discharging at least part of the expanded perlite particles having a diameter of less than 0.2 mm. from said vortex separator; and
   (c) passing the remainder of said expanded perlite to said second spray head.

4. The process recited in claim 1 further comprising said paraffin hydrocarbon being in the proportion of from about 2 to about 10 kilogrammes per cubic meter of perlite.

5. The process recited in claim 1 further comprising said paraffin hydrocarbon being sprayed at a temperature of less than 130° C.

6. The process recited in claim 3 further comprising said liquid water repellent being sprayed at a temperature greater than 250° C.

7. A process for bonding the dust particles of dry perlite which has been expanded in an expansion oven at about 1100° C. comprising:
   (a) removing the expanded perlite from said expansion oven;
   (b) passing said expanded perlite through a vortex separator;
   (c) discharging at least part of the expanded perlite particles having a diameter of less than 0.2 mm from said vortex separator;
   (d) cooling the remainder of said expanded perlite to a temperature greater than 250° C.;
   (e) passing the expanded perlite in a loose free flowing stream at a temperature greater than 250° C. past a first spray head;
   (f) spraying a finely atomized liquid water repellent at a temperature greater than 250° C. from said first spray head upon said expanded perlite flowing therepast; then
   (g) further cooling the expanded perlite to a temperature of less than 130° C.;
   (h) passing the expanded perlite at less than 130° C. in a loose free flowing stream past a second spray head;
   (i) spraying a finely atomized paraffin hydrocarbon at a temperature of less than 130° C. from said second spray head upon said expanded perlite flowing therepast;
   (j) said paraffin hydrocarbon having a viscosity of from about 4 to about 8 centistokes measured at 20° C.; and
   (k) said paraffin hydrocarbon being sprayed in the proportion of from about 2 to about 10 kilogrammes per cubic meter of expanded perlite.

8. The process recited in claim 1 wherein said temperature of less than 130° C. is less than 100° C.

9. The process recited in claim 1 wherein the fraction of said perlite from said cyclone separator having a diameter of less than 0.2 millimeters is less than 10 percent.

10. The process recited in claim 7 wherein said temperature of less than 130° C. is less than 100° C.

11. The process recited in claim 7 wherein the fraction of said perlite from said cyclone separator having a diameter of less than 0.2 millimeters is less than 10 percent.

* * * * *